(12) United States Patent
Roodenburg et al.

(10) Patent No.: US 7,862,255 B2
(45) Date of Patent: Jan. 4, 2011

(54) MARINE PIPELAYING SYSTEM FOR LAYING AN OFFSHORE PIPELINE

(75) Inventors: Joop Roodenburg, Delft (NL); Terence Willem August Vehmeijer, Den Haag (NL)

(73) Assignee: Itrec BV, Shiedam (NL)

( * ) Notice: Subject to any disclaimer, the term of this patent is extended or adjusted under 35 U.S.C. 154(b) by 310 days.

(21) Appl. No.: 11/884,946

(22) PCT Filed: Feb. 24, 2006

(86) PCT No.: PCT/EP2006/001781

§ 371 (c)(1),
(2), (4) Date: Aug. 12, 2008

(87) PCT Pub. No.: WO2006/089786

PCT Pub. Date: Aug. 31, 2006

(65) Prior Publication Data
US 2009/0324339 A1 Dec. 31, 2009

(30) Foreign Application Priority Data

Feb. 25, 2005 (EP) ................................. 05075468

(51) Int. Cl.
*F16L 1/12* (2006.01)
(52) U.S. Cl. .................... 405/166; 405/158; 405/168.3; 405/168.4
(58) Field of Classification Search ............. 405/154.1, 405/158, 166, 168.1, 138.2, 168.3, 168.4, 405/169, 170, 18.2; 414/222.04, 222.07, 414/225.01
See application file for complete search history.

(56) References Cited

U.S. PATENT DOCUMENTS

| 5,348,423 | A | 9/1994 | Maloberti et al. |
| 6,056,478 | A | 5/2000 | Martin et al. |
| 6,352,388 | B1 | 3/2002 | Seguin |

(Continued)

FOREIGN PATENT DOCUMENTS

WO WO 96/18839 A1 6/1996

(Continued)

OTHER PUBLICATIONS

Drilling Vessel "Deep Blue", built 2001, http://www.ship-technology.com/projects/deep_blue, pp. 1-3 and http://www.shipspotting.com/modules/myalbum/photo-1037945-Deep+Blue, pp. 1-3.

(Continued)

*Primary Examiner*—Tara Mayo-Pinnock
*Assistant Examiner*—Benjamin Fiorello
(74) *Attorney, Agent, or Firm*—Birch, Stewart, Kolasch & Birch, LLP

(57) ABSTRACT

A marine pipelaying system and method for installing an offshore pipeline that includes one or more accessories. The system comprises a vessel (1), a pipeline launch device (10) for launching the pipeline (2) from the vessel in the direction of the seabed, and a clamping device (30) adapted to support the weight of the previously launched pipeline. The system further includes an accessory handling device, which is adapted to receive and support an accessory (40) and allow displacement thereof between an receiving position, wherein the accessory is received by the handling device and a pipeline connecting position, wherein the accessory can be connected to the pipeline (2).

43 Claims, 17 Drawing Sheets

U.S. PATENT DOCUMENTS

| | | |
|---|---|---|
| 6,796,742 B1 | 9/2004 | Roger et al. |
| 2002/0021943 A1 | 2/2002 | Frijns |
| 2002/0159839 A1 | 10/2002 | Frijns et al. |
| 2003/0091395 A1 | 5/2003 | Stockstill |
| 2003/0147699 A1 | 8/2003 | Long et al. |
| 2003/0219313 A1* | 11/2003 | Giovannini et al. ......... 405/158 |
| 2003/0231931 A1 | 12/2003 | Moszkowski et al. |

FOREIGN PATENT DOCUMENTS

| | | |
|---|---|---|
| WO | WO-03/067019 A | 8/2003 |
| WO | WO-03/087652 A1 | 10/2003 |
| WO | WO-2004/068012 A | 8/2004 |
| WO | WO 2004/085898 A1 | 10/2004 |
| WO | WO 2006/054891 A1 | 5/2006 |

OTHER PUBLICATIONS

Final Office Action dated Jun. 10, 2010 in U.S. Application No. 11/883,850.

International Search Report dated Oct. 24, 2005 in International Application No. PCT/NL2005/000093.

Non-Final Office Action dated Dec. 1, 2009 in U.S. Appl. No. 11/883,850.

Office Action dated Jan. 27, 2009 in European Application No. 05710878.9.

Office Action dated Mar. 2, 2010 in European Application No. 05710878.9.

Office Action dated May 20, 2008 in European Application No. 05710878.9.

* cited by examiner

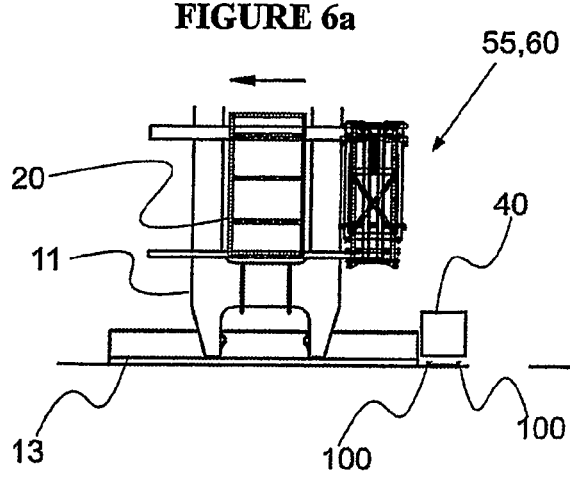
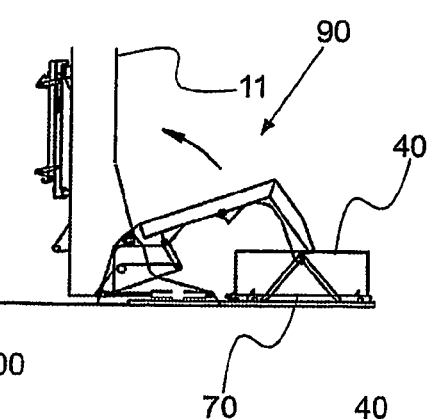
FIGURE 6a FIGURE 6b
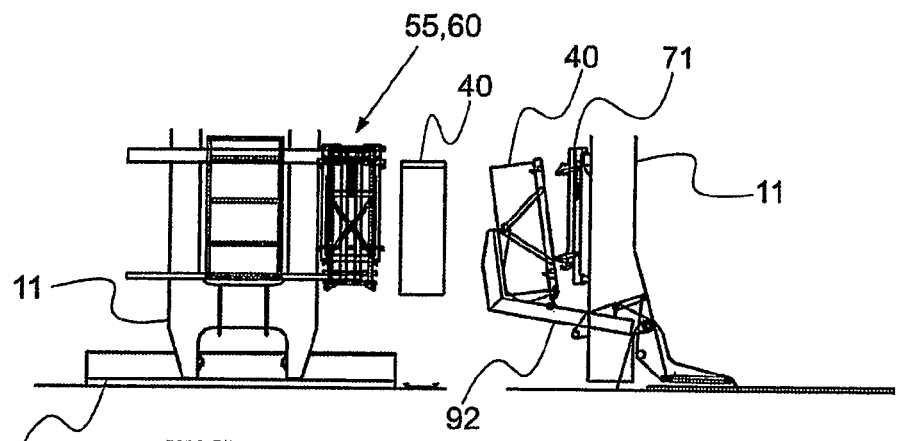
FIGURE 6c FIGURE 6d
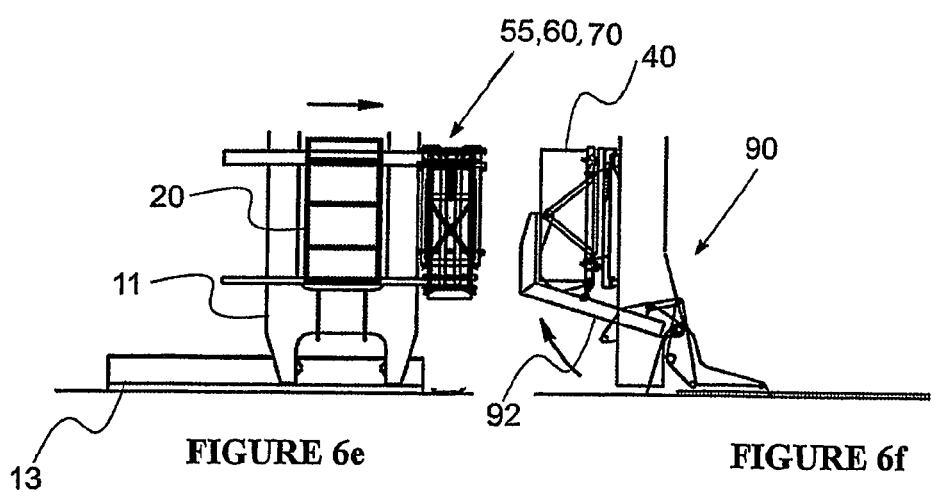
FIGURE 6e FIGURE 6f

FIGURE 7c
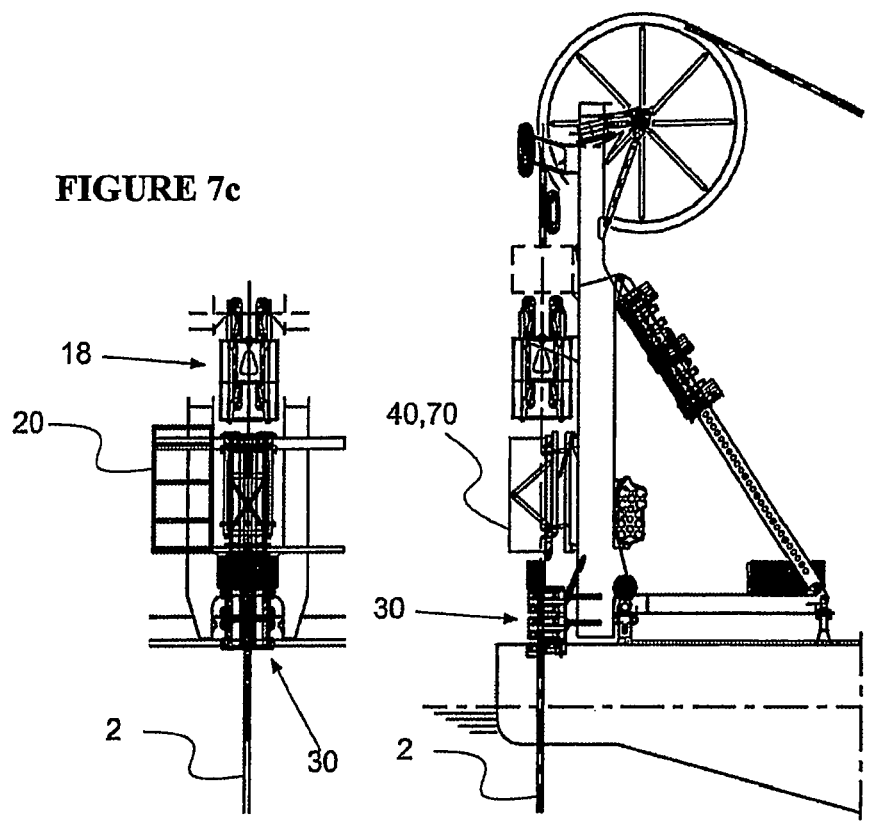
FIGURE 7d
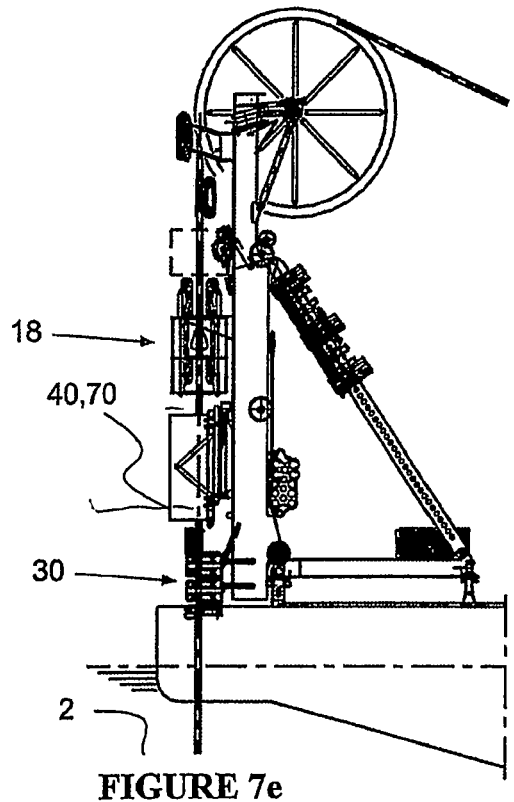
FIGURE 7e

Figure 11C:
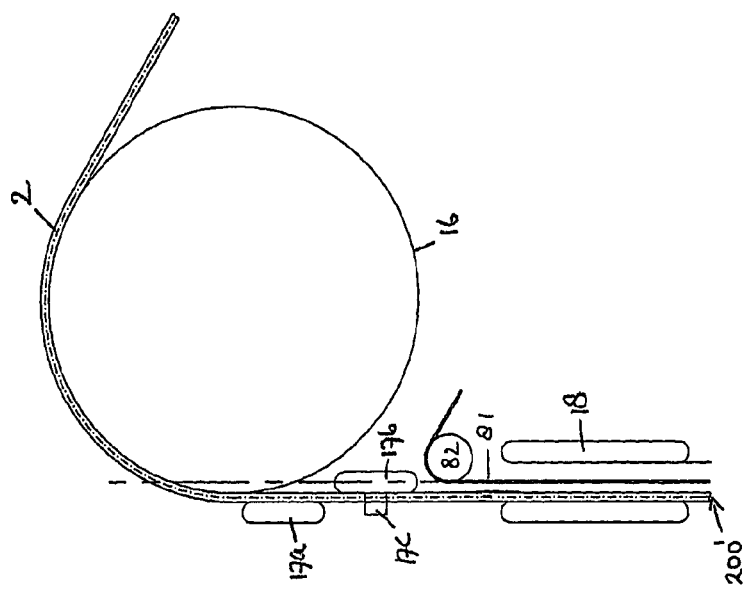
Figure 11B:
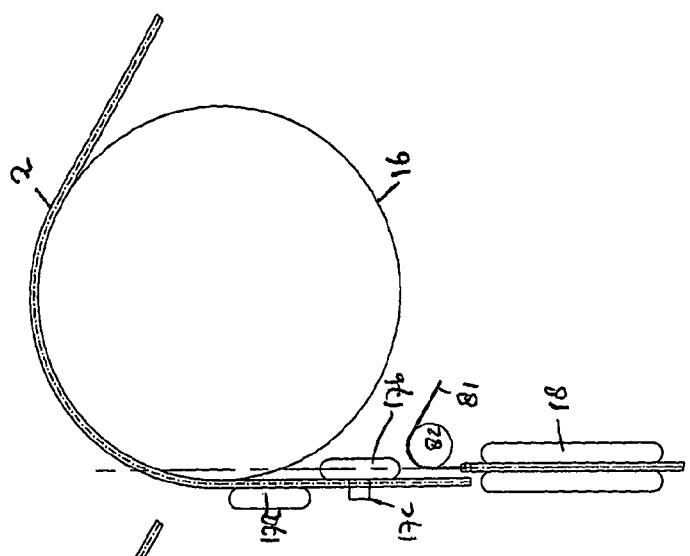
Figure 11A:
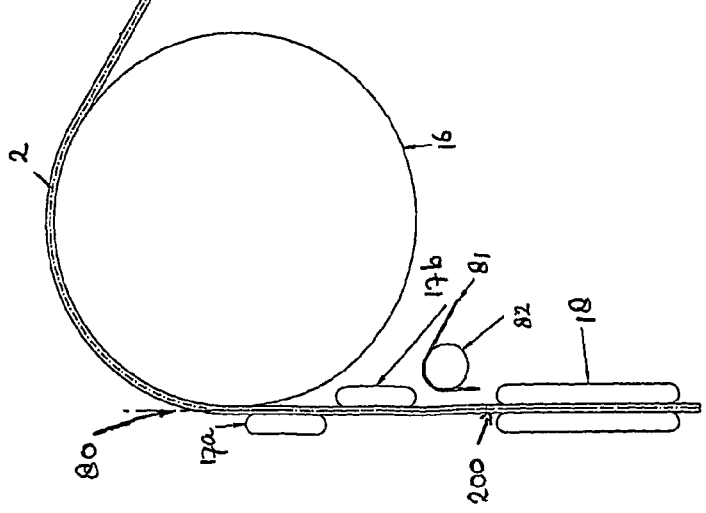
Figure 11:
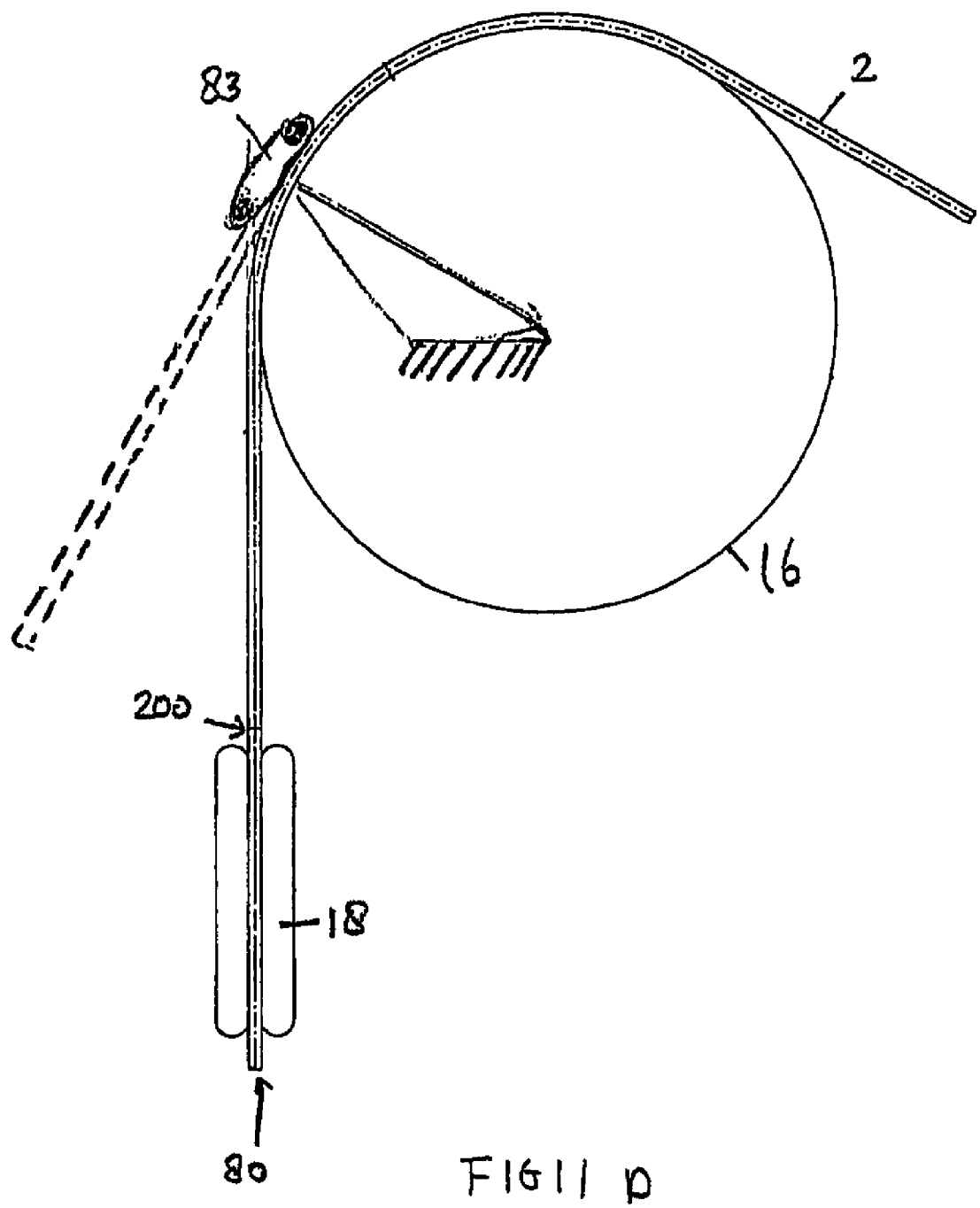

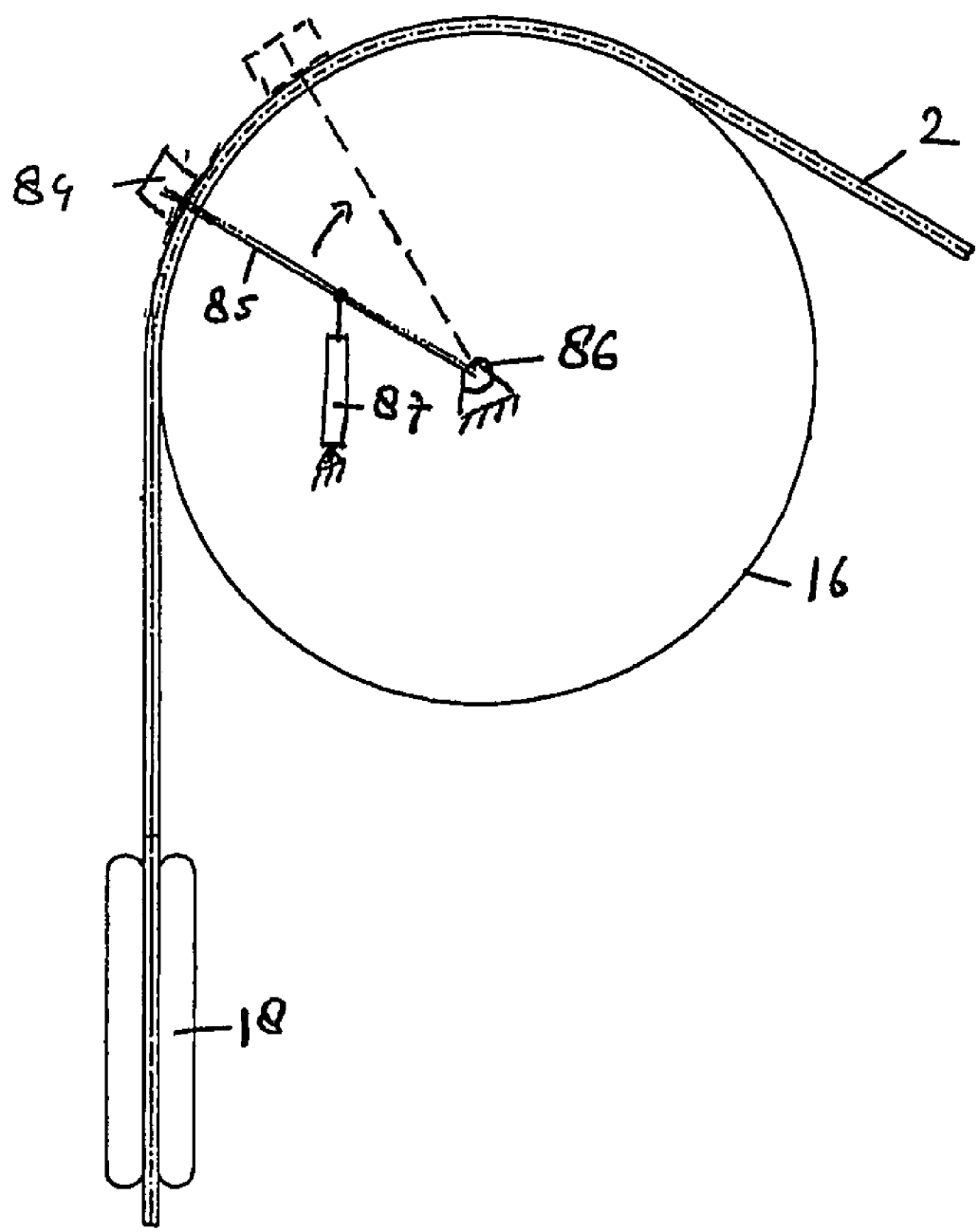
FIG 11.E

MARINE PIPELAYING SYSTEM FOR LAYING AN OFFSHORE PIPELINE

The present invention relates to a marine pipelaying system for installing an offshore pipeline that includes one or more accessories.

In most offshore pipelines to be laid on the seabed there is a need to install accessories (modules) on the ends of the pipeline and/or at one or multiple intermediate locations along the pipeline. These modules are usually quite large and heavy and are commonly designed to be welded to the pipeline. Examples of such accessories are: initiation fittings, pipeline end terminations (PLET), branches, inline SLED assemblies, inline manifolds, pipe valves, tee assemblies with their supporting structures and mud-mats.

Such pipeline accessories should often be welded inline with the pipeline. Often the accessory has pipeline connection parts at opposed ends thereof to connect the pipeline to those pipeline connection parts. It is however also known to have a pipeline accessory which is to be mounted, mostly by welding or using bolts, externally on the pipeline.

Various prior art solutions are known to mount an accessory at the end of a pipeline or at an intermediate location in or on a pipeline.

For example in WO 03/067019 a system for introducing an inline accessory into a pipeline is described. The pipelaying installation comprises a pipeline spool, a tensioner and a clamp, usually referred to as "hang-off" clamp. The clamp is adapted to support the weight of the launched pipeline which is suspended from said clamp. Furthermore, this known system comprises a launch ramp, here having variable inclination, with a pipeline feeding position and an accessory connection position, arranged next to one another. The area in between the tensioner and the clamp can be used to install accessories into the pipeline. The clamp is capable of translating horizontally—while the launched pipeline is suspended therefrom—from the pipeline feeding position to the accessory connection position. Means are provided for lowering the pipeline and accessory connected thereto past the clamp.

The known techniques for inserting an accessory into or at the end of a pipeline while laying an offshore pipeline are unsatisfactory.

The object of this invention is to provide an improved technique and associated system for laying an offshore pipeline and fitting one or more pipeline accessories into or onto a pipeline, e.g. at the end and/or at intermediate locations of the pipeline.

The present invention provides a system according to claim 1.

Further embodiments of the inventive system are described in the subclaims and the description of the drawings.

The present invention further relates to a method wherein the inventive system is used.

The invention further relates to an accessory handling device, an accessory handling frame, and an accessory loader device as described herein, as well as the use thereof in a method for laying offshore pipelines.

The invention further relates to a pipelaying vessel provided with a system and/or an accessory handling device, and/or an accessory handling frame and/or an accessory loader device as described herein.

The present invention further relates to marine pipelaying system to be mounted on a vessel for installing an offshore pipeline by the reel-lay method in which pipeline one or more accessories can be included, the system comprising:

- a pipeline launch device for launching the pipeline from the vessel in the direction of the seabed in a pipeline launch trajectory,
- a storage reel for pipeline to be laid,
- a pipeline guide, preferably a pipeline guide wheel, arranged at an elevated position in said pipeline launch device,
- one or more tensioners arranged on said pipeline launch device below said pipeline guide for supporting the weight of the launched pipeline,
- wherein said pipeline launch device is provided with withdrawal means for withdrawing a section of the pipeline upwards out of the pipeline launch trajectory.

The withdrawal means may comprise a motor-driven track adjacent the pipeline guide and acting on the pipeline where it is supported by the pipeline guide. In an alternative embodiment the withdrawal means comprise a clamp for clamping the pipe onto the pipeline guide, said clamp is mounted on a rotatable arm, which is rotatable together with the pipeline guide.

Figure 1:
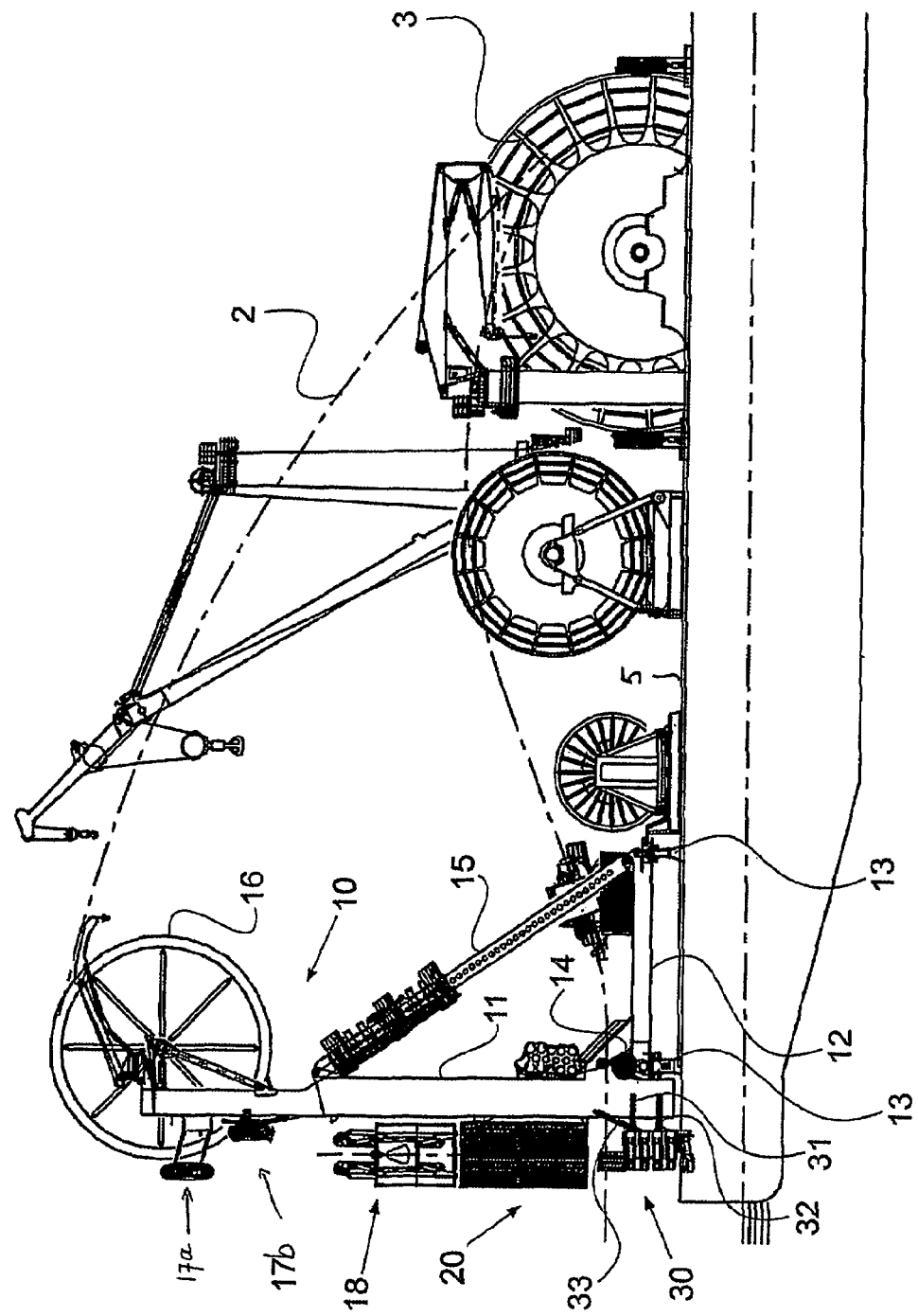
Figure 2:
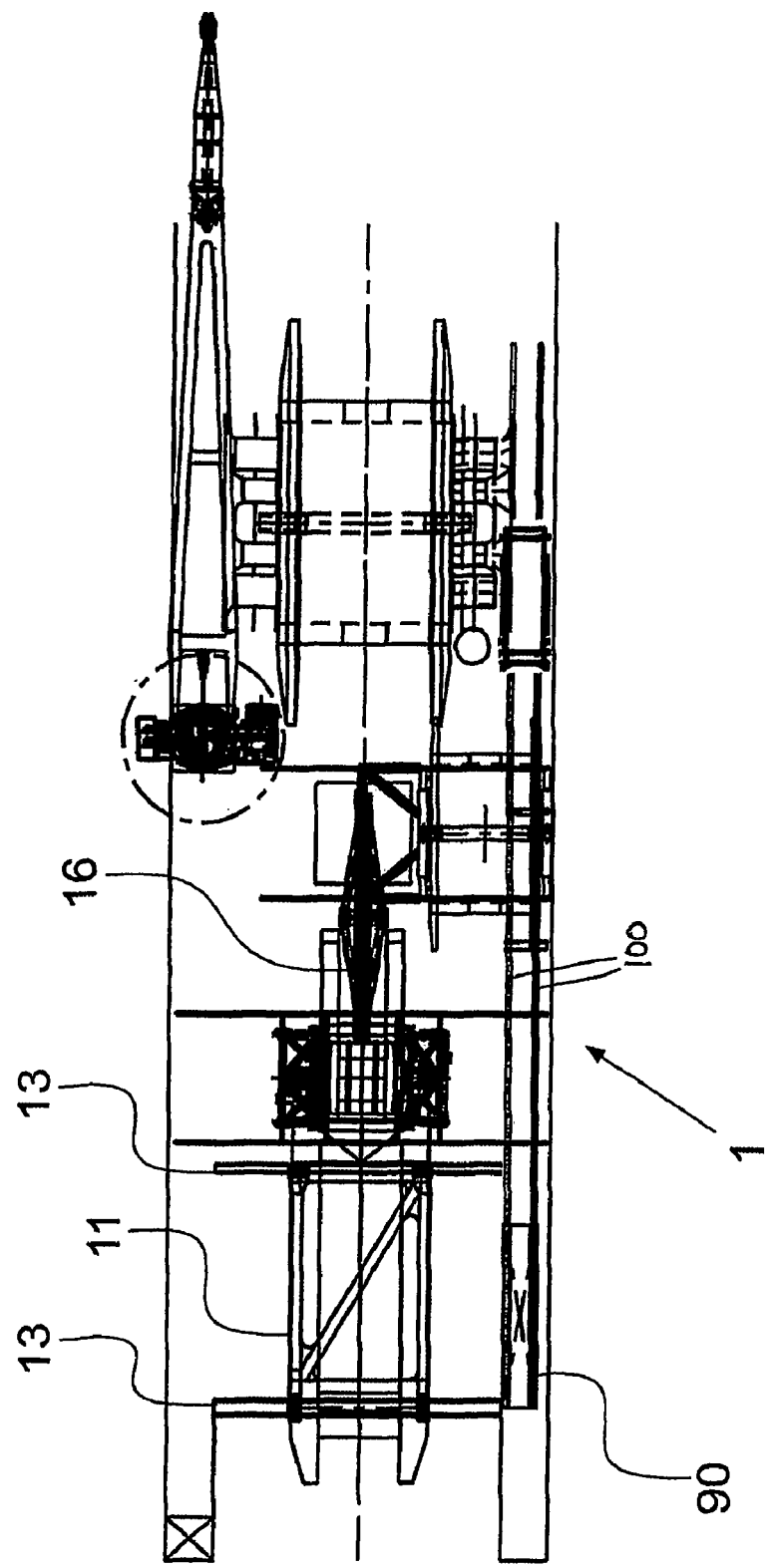
Figure 3:
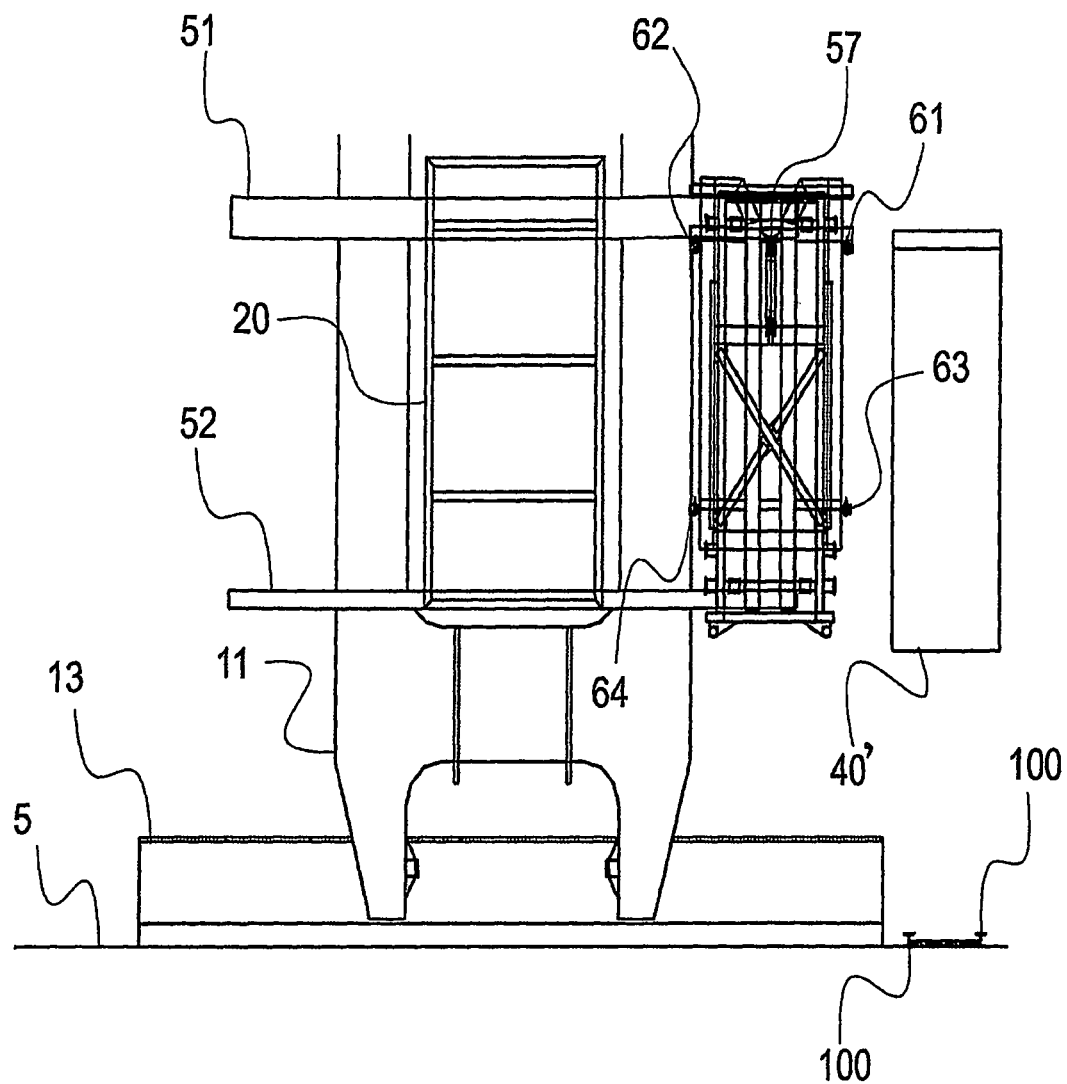
Figure 4:
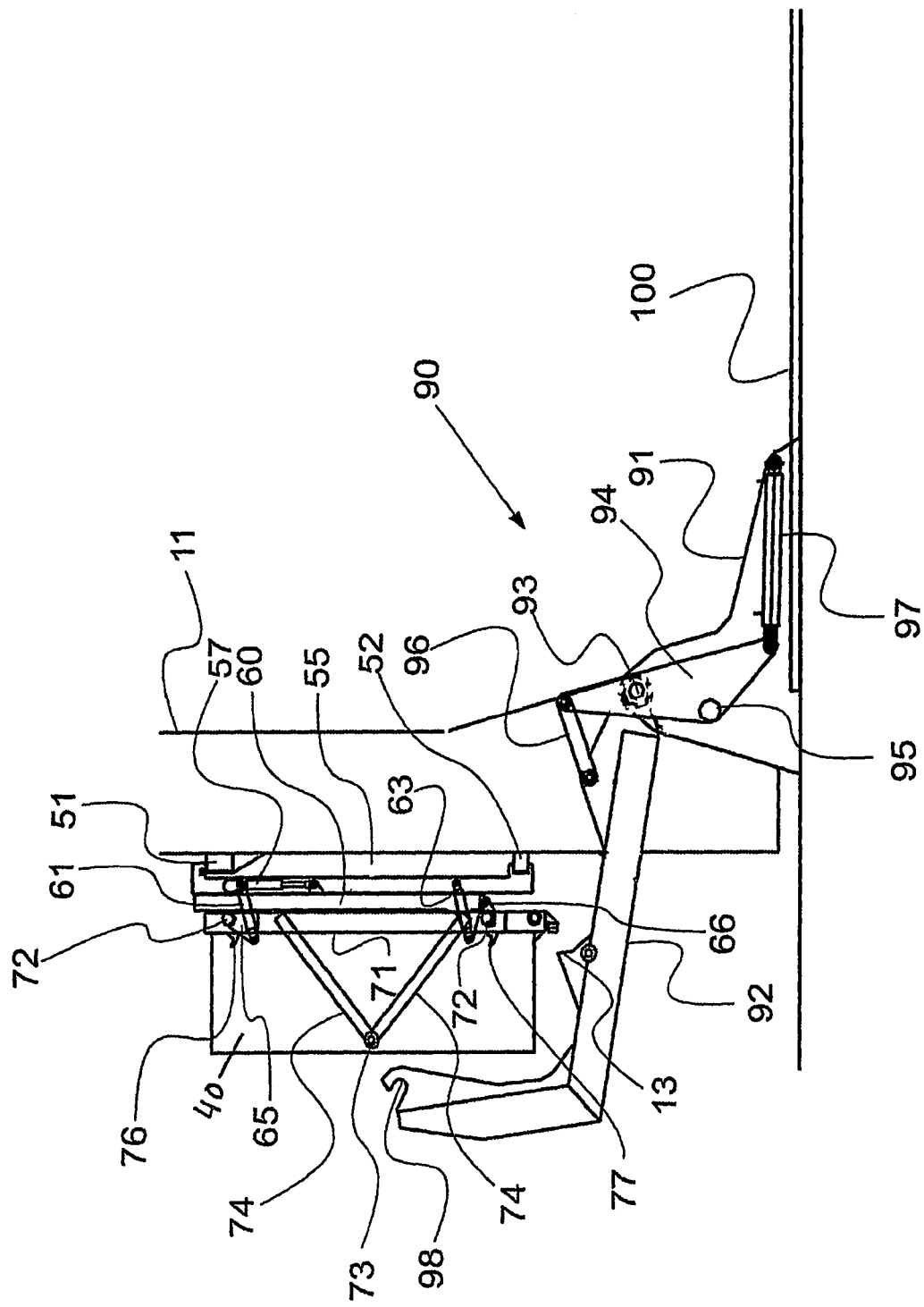
Figure 5:
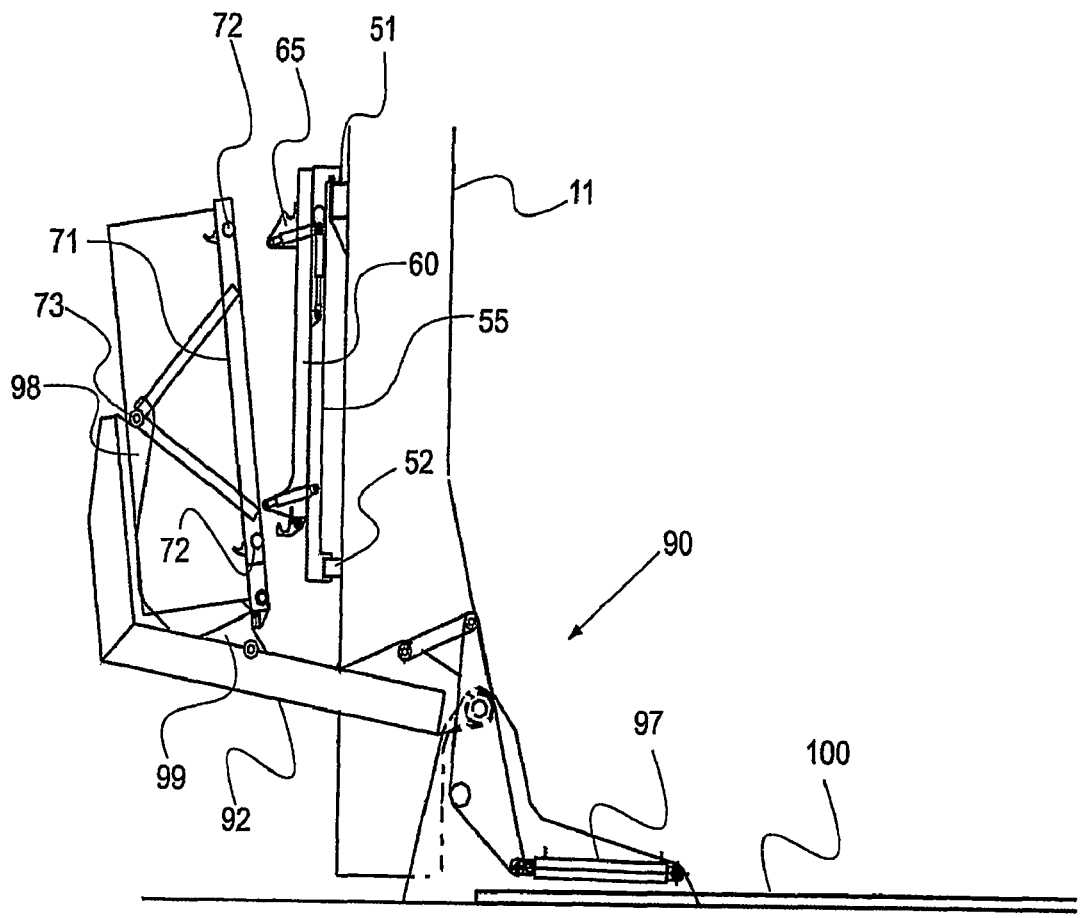
Figure 6G:
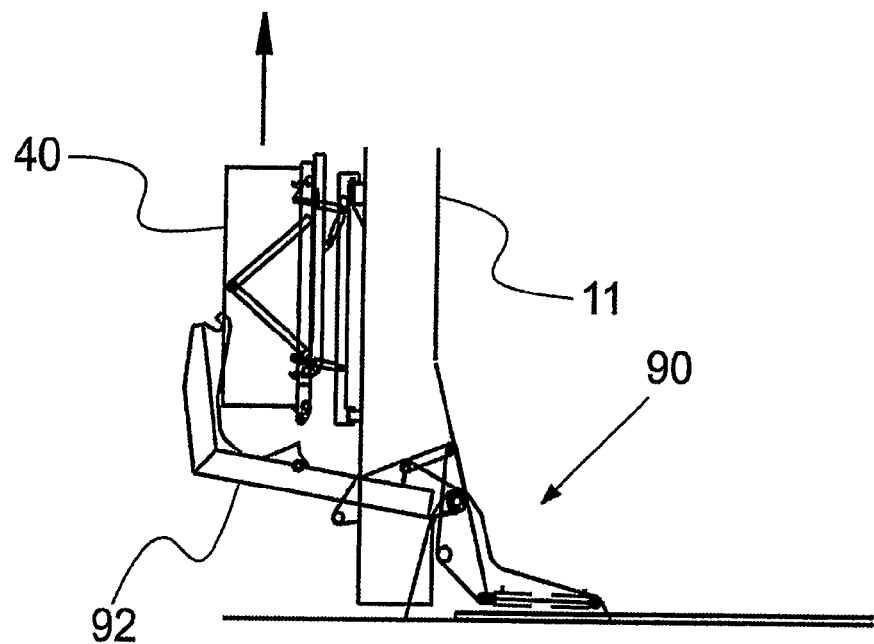
Figure 6H:
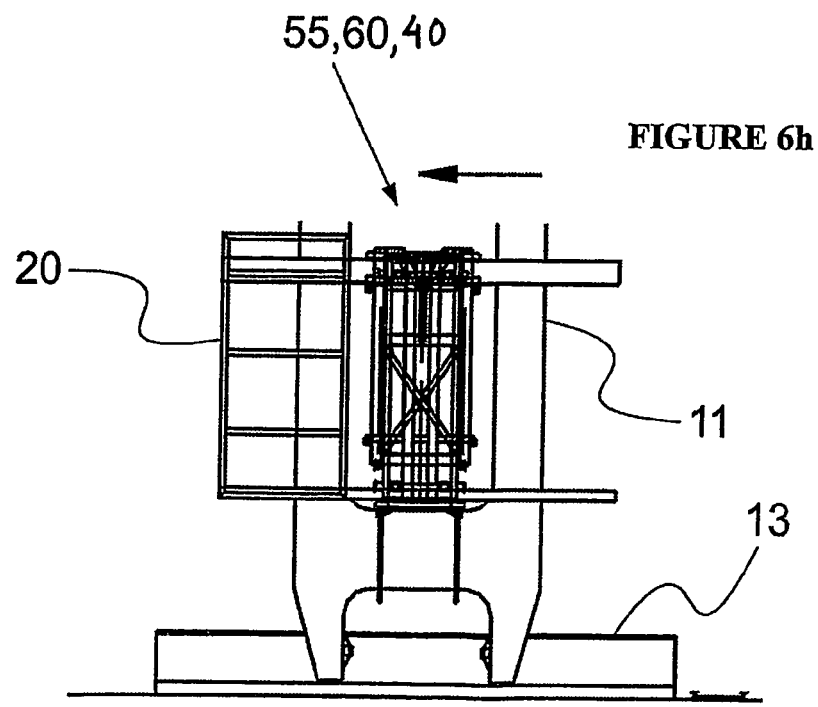
Figure 7B:
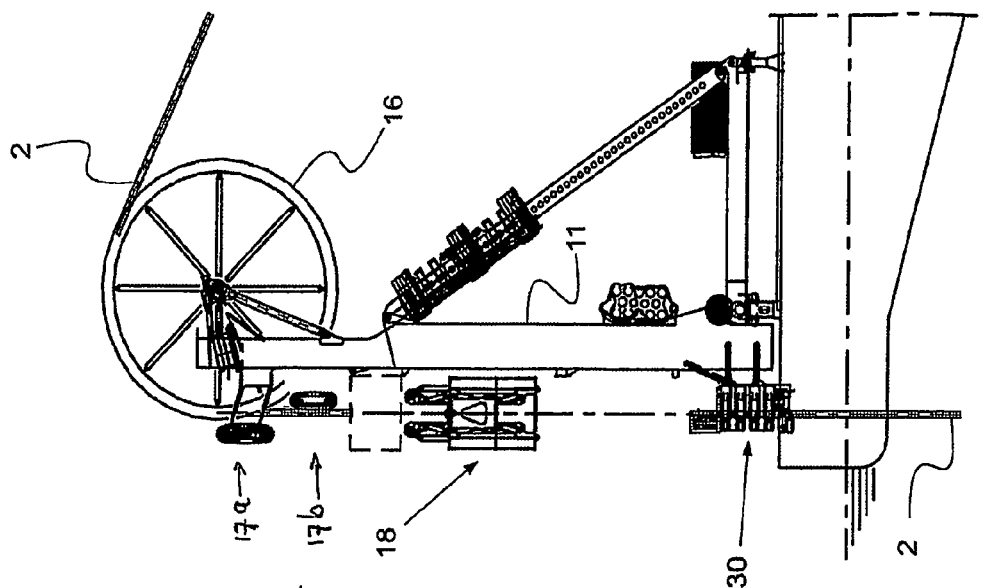
Figure 7A:
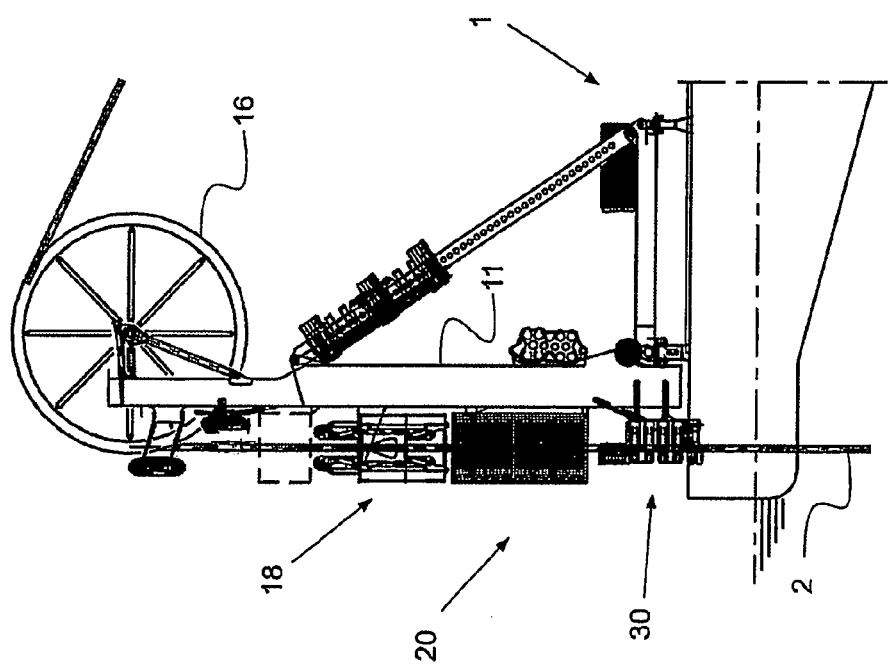
Figure 7F:
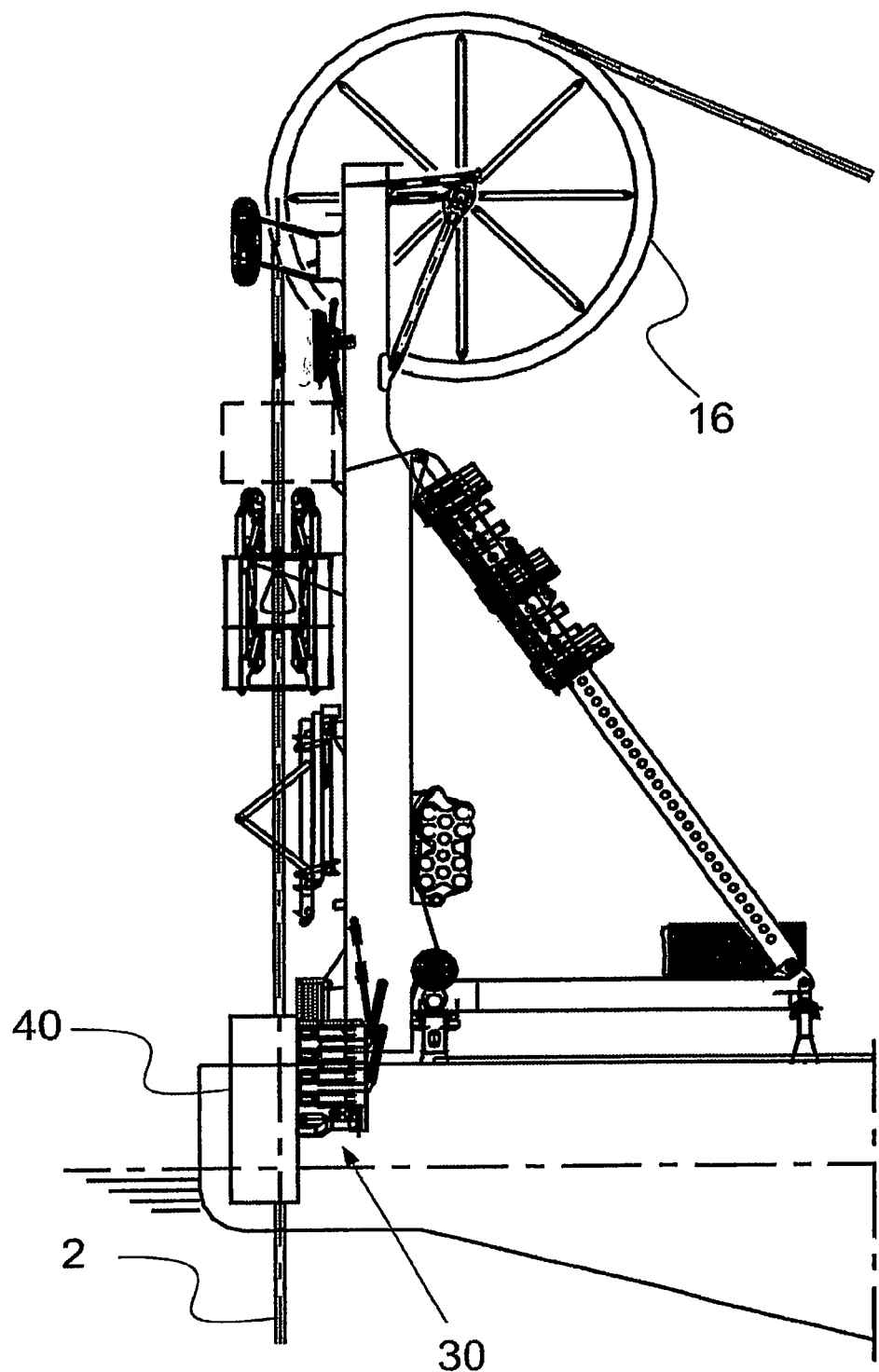
Figure 7G:
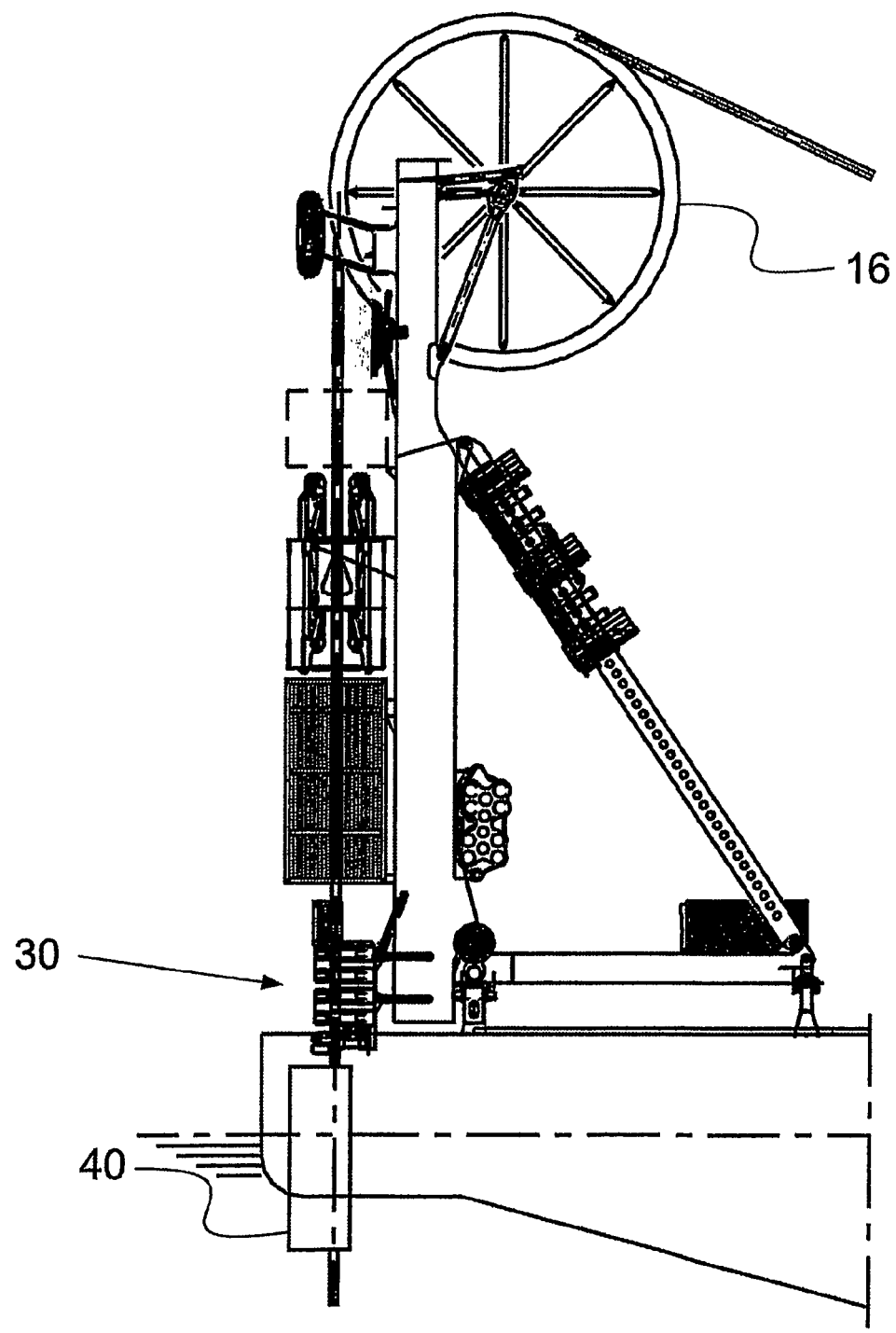
Figure 8A:
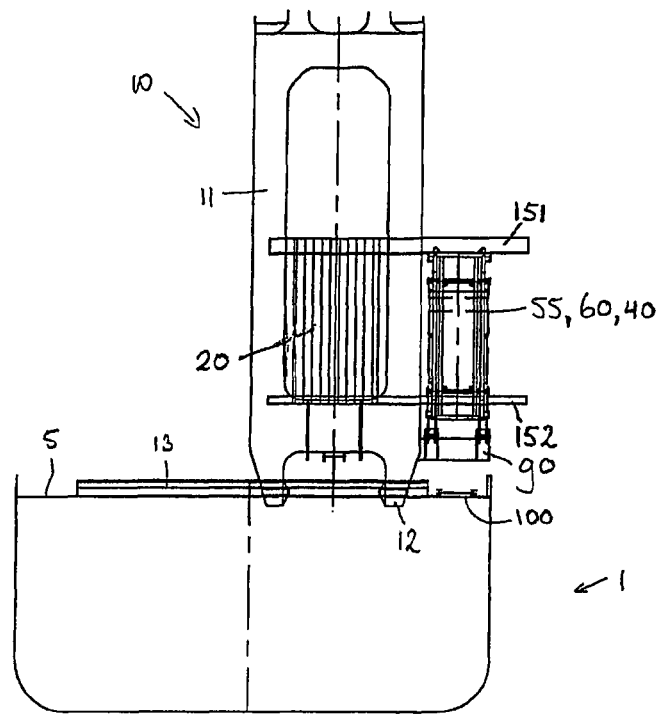
Figure 8B:
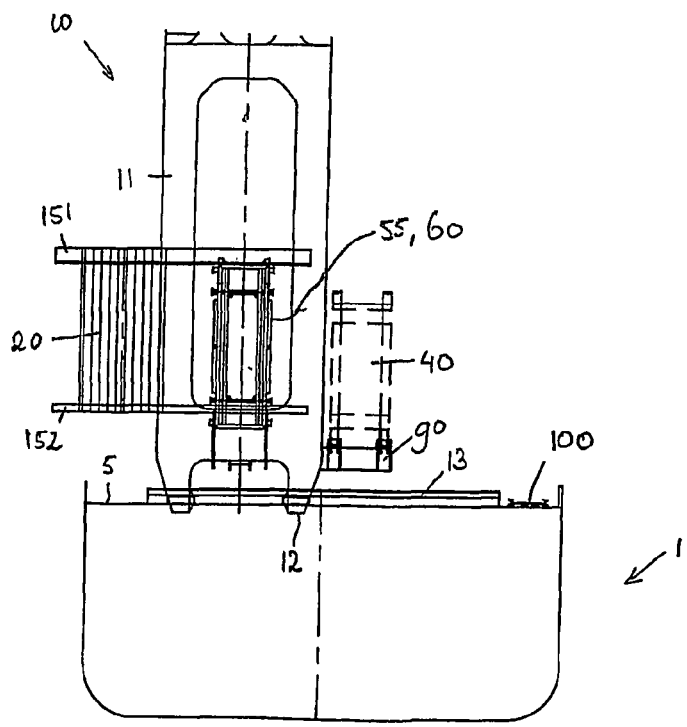
Figure 9A:
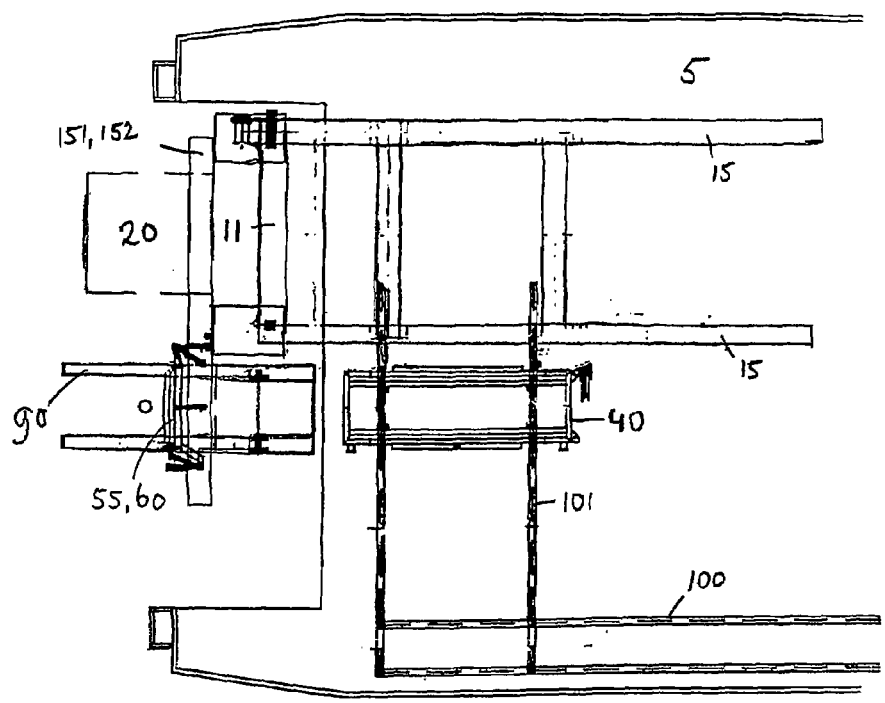
Figure 9B:
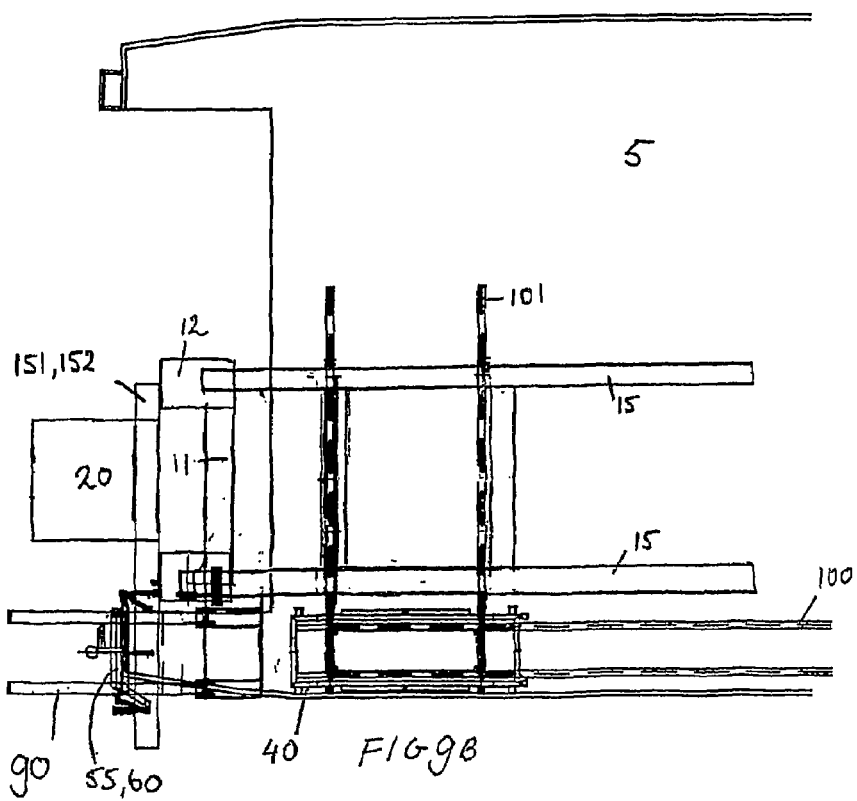
Figure 10:
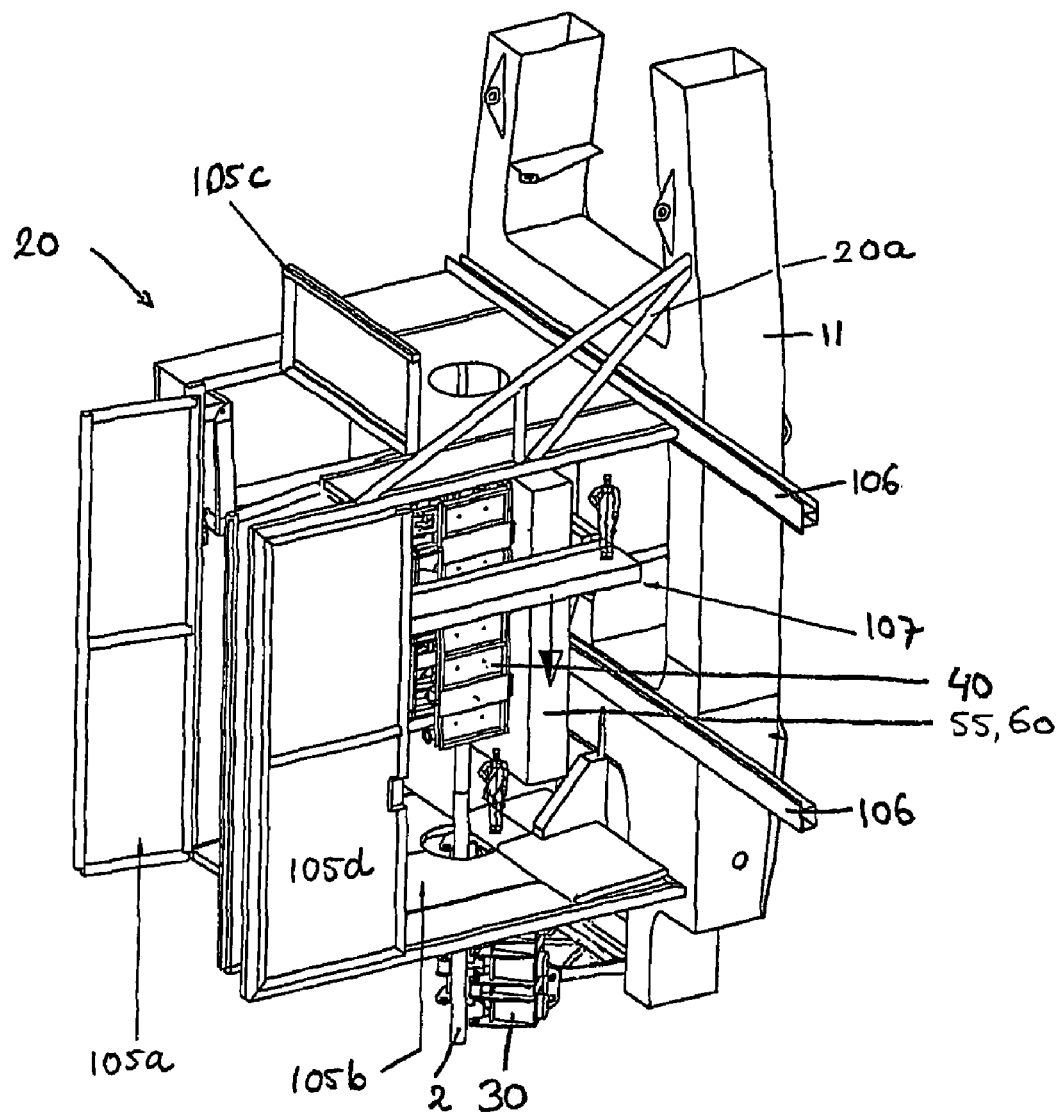

In the drawings:

FIG. 1 schematically shows a part of a reel-lay pipelaying vessel provided with an exemplary embodiment of the system according to the invention, FIG. 2 shows a plan view of a part of the vessel of FIG. 1, wherein the launch device is in inclined position, FIG. 3 shows in a side view a part of the launch structure of the vessel of FIGS. 1,2, an accessory handling frame supported by the accessory handling device, as well as the accessory loader device of the invention, FIG. 4 shows in a rear view the launch structure, the accessory handling device, and the accessory handling frame of FIG. 3, FIG. 5 in a view similar to FIG. 3 a part of the launch structure, the accessory loader device, and an accessory handling frame held by said loader device, FIGS. 6a-h illustrate the loading of an accessory onto the accessory handling device according to the invention, and FIGS. 7a-g illustrate the integration of an accessory into a pipeline according to the invention, FIG. 8. shows in a side view a part of the launch structure of the vessel of FIGS. 1,2, and an accessory handling device, workstation and accessory loader device according to a further embodiment of the invention, FIG. 9. shows in a plan view the stern of a vessel with a launch structure, an accessory handling device, workstation and accessory loader device according to FIG. 8, FIG. 10 schematically shows a part of the launch structure of a vessel, an embodiment of a workstation and an accessory handling frame, FIGS. 11a-e schematically show a part of a reel-lay pipelaying vessel according to FIG. 1 provided with four exemplary embodiments of a 'top-module' according to the invention.

In the figures a "Reel-Lay" pipelaying vessel 1 is shown for laying an offshore pipeline. As is common in reel-laying the pipeline 2 to be laid is manufactured in a continuous length on board of the pipelaying vessel or at a shore facility and then spooled onto a large spool 3. This spool or storage reel 3 is often a vertical spool, but it is also known to arrange the spool 3 horizontally. In the latter version the pipelaying technique is also known as "carousel-lay". The pipeline can be a rigid pipeline or a flexible pipeline as is known in the art.

During the pipelaying process the pipeline 2 is unwound from the spool 3.

The vessel 1 is provided with a pipeline launch device 10 for launching the pipeline 2 from the vessel 1 in the direction of the seabed. This launch device 10 here is arranged at the stern of the vessel 1. It could also be arranged at another location, e.g. at a moonpool of the vessel.

The launch device 10 here comprises a launch structure 11 mounted on a travelling base 12. The base 12 is slidably supported (e.g. by a skid arrangement) on support rails 13 on a deck 5 of the vessel. The rails 13 here extend essentially parallel to the stern of the vessel, so that the launch device 10 can assume several positions along said stern.

The structure 11 is pivotable about a pivot axis 14 with respect to the base 12. One or more support struts 15 are provided, here telescopic support struts, to maintain a desired inclination of the launch structure 11.

At the upper end the structure 11 is provided with a pipeline guide 16, here a rotatable guide wheel, for the pipeline 2 coming from the spool 3.

The launch structure 11 here further is provided with two pipeline straightener tracks 17a and 17b and at least one pipeline tensioner 18. The pipeline tensioner 18 commonly includes multiple tracks with friction pads which engage on the pipeline 2.

Below the tensioner 18 the launch structure 11 here is provided with a displaceable workstation 20, which at least provides a shielded working area, e.g. a room, at a pipeline connecting position of the system when said workstation 20 is in an operating position thereof.

The workstation 20 is displaceable to a remote position to allow for the placement of an accessory 40 at said pipeline connecting position as will be explained below.

Below said pipeline connecting position the launch structure 11 is provided with a pipeline clamping device 30, which clamping device is adapted to clamp and support the weight of the previously launched pipeline. Such a clamp is commonly referred to as a "hang-off clamp".

The clamp 30 here is arranged movable, so as to allow for the passage of an accessory 40 integrated into the pipeline 2 as will explained further on.

Here the clamp 30 is held by a parallelogram linkage, including parallel support bars 31, 32, which are at one end pivotable connected to the clamp 30 and at the other end to the launch structure, the pivot axes lying essentially horizontal. One or more (hydraulic) actuators 33 are provided for moving and positioning the clamp 30. As such the clamping device 30 is mounted for movement between an active position near the firing line of the pipeline and a remote position.

As has been mentioned before, it is often desired to fit an "accessory" at the end of the pipeline or at an intermediate position in or onto the pipeline 2.

Such accessories are commonly large and heavy items, such as a PLET (PipeLine End Terminal).

In the figures an accessory 40 has been depicted schematically as a block for the purpose of simplicity only. It will be clear that an accessory can have a different shape.

The system also includes an accessory handling device, which is adapted to receive and support an accessory 40 and allow displacement of the accessory 40 between an receiving position, wherein the accessory 40 is received by the handling device and the pipeline connecting position (here below the tensioner 18), wherein the accessory 40 can be connected to the pipeline.

Not shown in the figures are accessory connecting means for connecting the accessory 40 to the pipeline, e.g. welding means.

As can be seen in FIG. 3 two horizontal rails 51, 52 are mounted on the launch structure 11 above another.

The workstation 20 is slidable supported by these rails 51, 52, so that the workstation 20 can be moved from the central position to the side in order to make room for an accessory 40.

As can be seen in FIG. 4 the accessory handling device includes a first subframe 55, which is mounted on said rails 51, 52 and is slideable along said rails 51, 52. The accessory handling device also includes a second subframe 60, which is supported by said first subframe 55 so as to be orientable in one or more degrees of freedom with respect to said first subframe 55.

In the embodiment shown here the second subframe 60 is movable parallel to the first subframe 55, e.g. up and down with respect to said first subframe 55. This is done here by an hydraulic actuator 57, which is provided for parallel, e.g. up and down motion, of the second subframe 60 with respect to the first subframe 55.

Between the first and second subframes 55, 60 also a first set of hydraulic positioning actuators 61, 62 and a second set of hydraulic positioning actuators 63, 64 are provided. The first and second sets are spaced apart from one another and each include at least two spaced apart actuators, so as to allow accurate orientation of the second subframe with respect to the first subframe, both with regard to the distance between the subframes and the angular orientation of the second subframe with respect to the first subframe.

Preferably each of the actuators 61-63 is controllable such that the second subframe 60 is orientable so as to include an angle with the first subframe 55, e.g. about one or in this case two degrees of angular freedom.

The second subframe 60 here has hook members 65, 66 adapted to hang the accessory 40 thereon. It will be appreciated that other fastening means could be provided (e.g. on the second subframe) to (temporarily) fasten the accessory (or the associated accessory handling frame as will be explained further on) to the second subframe.

The actuators 57, 61-64, allow for an accurate positioning of the accessory fastened to the second subframe 60 with respect to the pipeline 2, which facilitates the connection process, e.g. the welding process.

In this example the accessory 40 is provided with an accessory handling frame 70, which here is detachable from the accessory 40.

In a preferred embodiment it is envisaged that a standard accessory handling frame 70 (e.g. of uniform principal dimensions) is employed for handling accessories on board of a pipelaying vessel, such that different accessories can be handled in a uniform manner.

In this example the accessory handling frame 70 has a (elongated) pallet 71, provided with support extensions 72 on opposed sides thereof, which support extensions 72 can engage with the hook members 65, 66 of the second subframe 60.

The accessory 40 can be placed on the pallet 71 and fixed thereto, e.g. by temporary welds or other detachable fixation means.

The frame 70 has one or more lift hook engagement members 73, here at the top end of a triangular arranged bars 74 at each longitudinal side of the pallet 71.

In FIG. 4 it can be seen that the detachable accessory handling frame 70 also has one or more hook members 76, 77, essentially identical to said one or more hook members 65, 66 on said second subframe 60, such that once a first accessory has been integrated into said pipeline, the associated detachable accessory handling frame can remain on said second subframe, and a new accessory, having an essentially similar detachable accessory handling frame can be hung on said detachable accessory handling frame of said first accessory.

As will be clear the accessory handling device is adapted for horizontal translation along the rails 51, 52 (e.g. by actuators not shown in the drawings) and in this manner an accessory supported by said handling device can be moved from an accessory receiving position to the pipeline connecting position.

In FIG. 3 the reference numeral 40' denotes a position wherein the accessory is held before it is picked up by the handling device. It will be clear that in order to do so the launch structure 11 has to be slid sideways in this embodiment. In another embodiment the rails 51, 52 are extendible to the side, so that the handling device can reach said position in the extended position of the rails 51, 52. In yet another embodiment the accessory is presented within the range of the rails 51, 52.

For moving an accessory 40 into the receiving position the system further includes an accessory loader device 90, of which an exemplary embodiment will now be explained in detail.

The accessory loader device 90 is mounted on a deck of the vessel 1, preferably adjacent to the pipe launch device 10, here basically at one end of the rail 13 closest to the stern of the vessel.

In order to supply an accessory 40 to the loader device 90 the vessel 1 here is provided with an accessory transportation rail structure 100, here with parallel rails 100 extending across at least a part of a deck of said vessel, e.g. along a side of the deck. It is envisaged that the accessory handling frame 70 is adapted to engage on said transportation rail structure 100, e.g. with rollers or a skidding arrangement.

The loader device 90 here comprises a base 91 mounted on the vessel and a pivotable loader arm 92. The loader arm 92 is pivotable about a horizontal pivot axis 93 with respect to the base 91.

The loader device 90 further comprises a first linkage member 94, pivotable about an associated horizontal pivot axis 95 with respect to the base 91, and a second linkage member 96, extending between said first linkage member 94 and the loader arm 92 and pivotable connected thereto.

Also an hydraulic actuator 97 is mounted between the base 91 and said first linkage member 94, so that operation of the hydraulic actuator 97 cause the loader arm 92 to pivot.

The loader arm 92 has, here at its free end, one or more lift hooks 98 engageable with the members 73 of the accessory handling frame 70. The loader arm 92 can hook onto a frame 70 as the frame 70 is on the transportation rails 100 next to the loader device 90. Then the loader arm 92 can be pivoted, so that the frame 70 is lifted up.

The frame 70 will then come to bear against a tilt stop 99 on the loader arm 92. This causes the frame 70 to follow the tilting motion of the arm 92, and thus the frame 70 will be tilted from an essentially horizontal feed position into the more or less vertical receiving position.

The tilt stop (and or the co-operating part of the frame 70) could include a damper to dampen the contact between both.

Although the FIGS. 6a-h basically speak for themselves it will now be explained how an accessory 40 mounted in an associated handling frame 70 will be picked up by the loader 90 and brought into the pipeline connecting position, where the accessory 40 can be welded or the like onto the end of a pipeline or at an intermediate position on or into the pipeline.

In FIGS. 6a and 6b it is shown that the frame 70 and accessory 40 are picked up by the loader 90 (which is not shown in FIG. 6a). The frame 70 and the accessory 40 mounted thereon have been transported over the rails 100 towards the loader 90.

Then the arm 92 is tilted and along with said arm 92 the frame 70 and accessory 40. As such the assembly of the frame 70 and accessory 40 is brought into the position shown in FIGS. 6c,d. (the loader 90 is not shown in FIG. 6c).

The launch structure 11 is then translated sideways, such that the accessory handling device (including subframes 55, 60) comes into position opposite the assembly of frame 70 and accessory 40 still held by the loader 90. This movement of the launch device 11 is shown in FIG. 6 e. Then the frame 70 is hung on the handling device as explained before (FIG. 6f).

By operating the actuator 57 the frame 70 is lifted from the loader 90 as is shown in FIG. 6g.

In the meantime the workstation 20 has been slid sideways to make room for the frame and accessory 40. Now the frame 70 and the accessory can be moved to the pipeline connecting position shown in FIG. 6h.

As mentioned before an accessory is often mounted at an intermediate position into a pipeline. Referring to FIGS. 7a-g it will now be explained how this can be done on the vessel 1 provided with the accessory handling system.

In FIG. 7a the previously launched pipeline 2 is clamped by the clamping device 30. Then the pipeline 2 is cut off above the clamping device 30.

Then the upper part of the pipeline 2 is spooled back onto the spool 3, at least such that a gap is provided in which the accessory can be mounted. The tensioner 18 is used to provide backtension when spooling back the pipeline 2 onto the spool 3. Also the workstation 20 is here slid sideways to make room for the accessory. In this manner the situation of FIG. 7b is obtained.

In the manner explained referring to FIG. 6 the accessory 40 and the associated frame 70 are picked up by the loader and transferred to the accessory handling device and then moved into the pipeline connecting position, basically above the pipeline end held by the clamping device 30. This situation is shown in FIGS. 7c,d.

Then the accessory 40 is welded onto this pipeline end held by the clamping device 30. The pipeline end above the accessory 40 is lowered until it can be welded to the accessory as well. This is shown in FIG. 7 e.

After welding the accessory is detached from the frame 70. The pipeline weight is taken over from the clamping device 30 by the tensioner 18. Now the clamping device 30 opens and release the pipeline. The clamping device 30 is then moved to its remote position, which is such that the accessory can pass. This is shown in FIG. 7f.

In the meantime also the accessory handling device and the frame 70 still held thereby are moved sideways, to allow the repositioning of the workstation 20. If desired the clamping device can be moved into its operable position. This is shown in FIG. 7g.

It is noted that the present invention is not limited to the "reel-lay" pipelaying technique. For instance the accessory handling as described herein can also be advantageously used for the J-lay technique or the S-lay technique, for the purpose of installing an accessory into or onto a pipeline.

Preferably, in the operation performed by a system according to the present invention the launched pipeline maintains at a stationary position when the accessory is connected to the pipeline. Preferably, the combination of the clamping device 30 and the launched pipeline clamped in it is not moveable. Alternatively, the launched pipeline is moveable and can for example be slid sideways to a position remote from a pipeline launch trajectory or firing line.

A preferred embodiment of the invention is shown in FIGS. 8 and 9. Same parts as present in FIGS. 1-7 have been given same reference numerals. On vessel 1 a pipeline launch device 10 is positioned comprising a launch structure 11. Launch structure 11 is placed on a base 12, which is slidably supported on support rails 13.

Workstation 20 and first and second subframe 55, 60 of the accessory handling device are mounted on frame 151, 152. Accessory handling device subframes 55, 60 are also referred to as 'accessory line up tool'. The combination of frame 151, 152, workstation 20 and accessory handling device subframes 55, 60 is moveable as a whole with respect to pipeline launch structure 11. An advantage of this embodiment is that both the workstation 20 and first and second subframe 55, 60 can be moved out of the operating area of the accessory loader device 90.

When lowering a pipeline the frame 151, 152 is moved such that workstation 20 is in a launch trajectory of the pipeline. Accessory handing device subframes 55, 60 are positioned next to launch structure 11. An accessory 40 can be loaded on the subframes 55, 60. After loading, the frame 151, 152 is moved sideways to bring the accessory 40 in the pipeline connecting position. When resume pipelaying the frame 151, 152 is moved to the other side to re-introduce the workstation 20 in the pipeline launch trajectory.

Possibly, workstation 20 and/or accessory handling device subframes 55, 60 are also moveable with respect to frame 151, 152 by providing intermediate rails (not shown).

In an alternative embodiment (not shown), the accessory handling device and/or the workstation are moveable in a vertical direction with respect to the launch structure, e.g. it is possible to displace the workstation vertically along the launch structure and introduce the accessory in the pipeline connecting position by a horizontal or rotating motion. Possibly the accessory handling device and/or the workstation are mounted on a frame that allows a vertical movement of the accessory handling device and the workstation. Alternatively the accessory handling device and/or the workstation are mounted on rails allowing individual movements of the accessory handling device and the workstation with respect to the launch structure in the vertical direction.

In yet another alternative embodiment, shown in FIG. 10, the workstation 20 is not moveable with respect to the launch structure 11, as is visible in this case by fixed bars 20a. The workstation 20, however, can be opened to allow entry of an accessory 40 and an accessory handling device 55, 60 into the workstation 20 in the pipeline connecting position. In the shown embodiment the workstation comprises doors 105a at the side of the workstation 20 remote from and parallel to the launch structure 11. Through these doors 105a, also called 'back doors', large objects can be introduced in the workstation 20. In the shown embodiment the doors 105a are arranged hingeable. Floor hatch 105b is also arranged moveable, preferably hingeable, to allow the passage of large accessories. Possibly roof hatch 105c can also partly be opened to allow entrance of a large accessory through the back doors. At the side of the workstation 20 perpendicular to the launch structure 11 a sliding door 105d is provided, which, in the shown embodiment, is slided sideways remote from the launch structure 11. Rails 106 are provided onto which an accessory handling device 55,60 is arranged skiddable. In the shown embodiment, rails 106 are connected to the launch structure 11, in the workstation 20. In the shown embodiment, the accessory handling device 55, 60 is skidded into the workstation with an accessory 40 connected to it. Pipeline 2 is connected to the accessory 40. To allow this entrance, doors 105d are opened and working platform 107 has temporarily traveled downwards in the workstation 20. In the shown embodiment, working platform 107 has traveled upwards again.

In yet another alternative embodiment (not shown) the accessory handling device is moveable with respect to the pipeline launch structure in a rotatable manner, e.g. about a vertical rotation axis. Possibly, but not necessarily, also the workstation is moveable with respect to the pipeline launch structure in a rotatable manner, e.g. about a vertical rotation axis.

For moving an accessory 40 into the receiving position the system includes an accessory loader device 90, of which an exemplary embodiment is explained in detail with respect to FIG. 5. The accessory loader device 90 in this embodiment is mounted on or connected to the pipeline launch device 11, as is clearly visible in FIG. 8, and therefor moveable together with the pipeline launch device 11 across the deck of the vessel over support rails 13. Irrespective of the position of the pipeline launch device 11, the accessory loader device 90 can move accessories 40 into the receiving position.

The embodiment of the vessel shown in FIG. 9 is provided with an accessory transportation rail structure 100, 101 extending across a part of a deck 5 of the vessel 1. The accessory transportation rail structure is composed of rails 100 extending along a side of the deck, and rails 101 extending perpendicular to rails 100. Rails 101 extend parallel to rails 13 of the base 12 of the launch device 10, hence parallel to the stern of the vessel. In any position of the launch device 10 along the stern, the accessory loader device 90 is located next to the launch device 10 and capable of moving accessories 40 into the receiving position, and accessories 40 can be transported to the accessory loader device 90 via accessory transportation rail structure 100, 101. Launch device 10 comprises a launch structure 11, placed on a base 12. Telescopic support struts 15 support the launch structure 11 and allow variation of the angle of the launch structure 11.

In FIG. 11 a detail of the shown embodiment of the upper end of the launch device 10 is depicted. The upper end of the launch structure 11 is provided with a pipeline guide 16, here a rotatable wheel, for the pipeline 2 coming from the spool 3. This rotatable wheel is sometimes referred to as an 'aligner'. Further are visible the tensioner 18 and an embodiment of a pipeline straightener comprising an upper track 17a, a lower track 17b and a hold clamp 17c, the function of which will be described later.

After cutting the pipeline above the clamp 30, one part of the pipeline 2 is supported by and suspending from the pipeline guide 16 and has a free end in the pipeline launch trajectory 80. In FIG. 11a the cut of the pipeline 2 is indicated by line 200, in FIG. 11c by line 200'.

The pipeline launch trajectory 80 has to be cleared to introduce a launch device for lowering the accessory, and possibly also the launched pipeline connected thereto. For example, an abandonment and recovery wire 81 and sheave 82 is introduced. Such an A&R cable 81 can carry the weight of the accessory and can be used to lower the accessory and the launched pipeline connected thereto, as is shown in FIG. 11b, for example to a position in which the clamp 30 can engage with the upper end of the accessory 40. After launching the accessory 40, the pipe has to get back in the pipeline launch trajectory 80 and in the main tensioner 18; sometimes with help of an initiation winch (not shown).

In a preferred embodiment shown in FIGS. 11a and b it is possible to move the combination of the part of the pipeline 2 supported by and suspending from the pipeline guide 16, the pipeline guide 16 and the straightener 17 out of the pipeline launch trajectory 80. By moving the pipeline 2 in this example backwards to aft side of the vessel 1 the pipeline launch trajectory 80 is cleared. The advantages of this embodiment are that the pipeline 2 does not have to make an extra bending/straightening cycle, and a less complicated and heavy construction is used.

The straightener 17 may comprise one or more tracks 17a, 17b. Possibly one of the tracks, preferably the lowest one, is provided with a clamp 17c. The pipeline 2 can be held by the clamp and the straightener 17b. The movement of the pipeline 2 is obtained by moving the complete 'top-module': pipeline guide 16, e.g. an aligner and straightener 17. Preferably, the aligner 16 and straightener 17 are connected to each other so they can move together.

Possibly, also the tensioner 18 or a track of the tensioner 18 is moveable, preferably together with the aligner 16 and the straightener 17. This is shown in FIG. 11c. The pipeline can be cut below the tensioner 18, at line 200', after which the tensioner 18 and the 'top-module' 16, 17 are moved out of the pipeline launch trajectory 80. This way, the part of the pipeline supported by and suspending from the pipeline guide 16 can remain in the tensioner 18, while this part of the pipeline is moved out of the pipeline launch trajectory 80. Possibly, the tensioner 18 is opened or retracted partially, so that both an A&R cable 81 and a part of the pipeline 2 pass through the tensioner 18. An advantage of a moveable 'top-module' 16, 17 and tensioner 18 is that pipelaunching can easily be resumed, since the pipeline 2 is easily re-introduced in the pipeline launch trajectory 80. In some cases, e.g. with small pipes or a small ramp angle, it will be necessary to keep the bottom of the pipe out of the pipeline launch trajectory with a small device, e.g. a chainblock.

In an alternative embodiment (not shown), two driven tracks are provided at the top of the launch device, directly beneath the pipeline guide wheel. The tracks allow to pull the cut pipeline upwards, out of the pipeline launch trajectory, e.g. to above an A&R sheave, and spool the pipe partly back on the storage reel. This can be unfavorable for the pipe, because some parts of the pipe will get an extra bending/straightening cycle. In addition, if a straightener is present, it is sometimes difficult to push the pipeline back through the straightener. For big pipes the power needed to push the pipe through the straightener is extreme and possibly too large, while for small pipes it may be impossible to push the curved pipe through the straightener without buckling of the pipe.

In the alternative embodiment shown in FIG. 11d, an upper motor-driven track 83, also referred to as a solex drive 83 is provided adjacent the pipeline guide, e.g. a guide wheel or aligner. The upper track 83 is pushing against the pipe 2, where the pipe is resting on the pipeline guide 16. The solex drive 83 is mounted on a stationary position. The solex drive 83 allows to spool back the pipeline towards the storage reel.

In yet another alternative embodiment shown in FIG. 11e, a clamp 84 is provided adjacent the pipeline guide, e.g. a guide wheel or aligner. The clamp 84 is pushing against the pipe 2, where the pipe is resting on the pipeline guide 16. The clamp 84 is mounted on an arm 85 having a pivot axis 86 coinciding with the pivot axis of the pipeline guide 16. An actuator, here hydraulic cylinder 87 is arranged to rotate the arm 85 and thus also the clamp 84 and the pipeline 2 and the pipeline guide wheel 16.

The invention claimed is:

1. A marine pipelaying system to be mounted on a vessel for installing an offshore pipeline that includes one or more accessories, the system comprising:
a pipeline launch device for launching the pipeline from the vessel in the direction of the seabed;
a pipeline clamping device adapted to clamp and support the weight of the previously launched pipeline;
an accessory handling device, which is adapted to receive and support an accessory and allow displacement thereof between an receiving position, wherein the accessory is received by the handling device and a pipeline connecting position, wherein the accessory can be connected to the pipeline; and
an accessory loader device for moving an accessory into said receiving position,
wherein said accessory loader device comprises:
a base mounted on said vessel;
a pivotable loader arm, said loader arm being pivotable about a horizontal pivot axis with respect to said base;
a first linkage member, pivotable about an associated horizontal pivot axis with respect to said base;
an actuator mounted between said base and said first linkage member; and
a second linkage member, extending between said first linkage member and said loader arm and pivotable pivotably connected thereto.

2. A marine pipelaying system to be mounted on a vessel for installing an offshore pipeline that includes one or more accessories, the system comprising:
a pipeline launch device for launching the pipeline from the vessel in the direction of the seabed;
a pipeline clamping device adapted to clamp and support the weight of the previously launched pipeline;
an accessory handling device, which is adapted to receive and support an accessory and allow displacement thereof between an receiving position, wherein the accessory is received by the handling device and a pipeline connecting position, wherein the accessory can be connected to the pipeline; and
an accessory loader device for moving an accessory into said receiving position,
wherein said accessory loader device has one or more lift hooks engageable with said accessory.

3. System according to claim 2, wherein said accessory loader device has one or more lift hooks engageable with said accessory, wherein said accessory handling device includes an handling frame associated with said accessory, and wherein said handling frame has one or more lift hook engagement member, each for engagement with a lift hook of said accessory loader device.

4. A marine pipelaying system to be mounted on a vessel for installing an offshore pipeline that includes one or more accessories, the system comprising:
a pipeline launch device for launching the pipeline from the vessel in the direction of the seabed;
a pipeline clamping device adapted to clamp and support the weight of the previously launched pipeline;
an accessory handling device, which is adapted to receive and support an accessory and allow displacement thereof between an receiving position, wherein the accessory is received by the handling device and a pipeline connecting position, wherein the accessory can be connected to the pipeline; and
an accessory loader device for moving an accessory into said receiving position,
wherein said accessory loader device is adapted to tilt said accessory from an essentially horizontal feed position into said receiving position, wherein said accessory loader device comprises a base mounted on said vessel and a pivotable loader arm, said loader arm being pivotable about a horizontal pivot axis with respect to said base, and wherein said loader arm has a tilt stop, arranged and construed to be contacted by said accessory upon tilting of said loader arm.

5. System according to claim 4, wherein said loading device includes a hydraulic actuator for actuating said loader arm.

6. System according to claim 4, wherein said tilt stop includes a damper.

7. System according claim 4, wherein said accessory loader device is mounted on said vessel, adjacent to said pipe launch device.

8. System according claim 4, wherein said accessory loader device is mounted on said pipeline launch device.

9. A marine pipelaying system to be mounted on a vessel for installing an offshore pipeline that includes one or more accessories, the system comprising:
 a pipeline launch device for launching the pipeline from the vessel in the direction of the seabed;
 a pipeline clamping device adapted to clamp and support the weight of the previously launched pipeline;
 an accessory handling device, which is adapted to receive and support an accessory and allow displacement thereof between an receiving position, wherein the accessory is received by the handling device and a pipeline connecting position, wherein the accessory can be connected to the pipeline; and
 an accessory loader device for moving an accessory into said receiving position,
 wherein said vessel is provided with an accessory transportation rail structure extending across at least a part of a deck of said vessel, for transportation of accessories to said accessory loading device.

10. System according to claim 9, wherein said vessel is provided with an accessory transportation rail structure extending across at least a part of a deck of said vessel, for transportation of accessories to said accessory loading device, wherein said accessory handling device includes an handling frame associated with said accessory, and wherein said accessory handling frame is adapted to be skidded over said transportation rail structure.

11. A marine pipelaying system to be mounted on a vessel for installing an offshore pipeline that includes one or more accessories, the system comprising:
 a pipeline launch device for launching the pipeline from the vessel in the direction of the seabed;
 a pipeline clamping device adapted to clamp and support the weight of the previously launched pipeline; and
 an accessory handling device, which is adapted to receive and support an accessory and allow displacement thereof between an receiving position, wherein the accessory is received by the handling device and a pipeline connecting position, wherein the accessory can be connected to the pipeline,
 wherein said accessory handling device includes a handling frame associated with said accessory.

12. System according to claim 11, wherein said pipeline connecting position is above the clamping device.

13. System according to claim 11, wherein the system further includes accessory connecting means for connecting the accessory to the pipeline.

14. System according to claim 11, wherein said accessory handling device is adapted for horizontal translation of said accessory.

15. System according to claim 11, wherein said accessory handling device has a rail structure.

16. System according to claim 15, wherein said rail structure is mounted on said pipe launch device.

17. System according to claim 11, wherein said system further includes an accessory loader device for moving an accessory into said receiving position.

18. System according to claim 17, wherein said accessory loader device is adapted to tilt said accessory from an essentially horizontal feed position into said receiving position.

19. System according to claim 17, wherein said accessory loader device comprises a base mounted on said vessel and a pivotable loader arm, said loader arm being pivotable about a horizontal pivot axis with respect to said base.

20. System according to claim 11, wherein the second subframe has one or more hook members adapted to hang the accessory thereon, and wherein the accessory handling frame is detachable from the accessory.

21. System according to claim 20, wherein said detachable accessory handling frame has one or more hook members essentially identical to said one or more hook members on said second subframe, such that once a first accessory has been integrated into said pipeline, the associated detachable accessory handling frame can remain on said second subframe, and a new accessory, having an essentially similar detachable accessory handling frame can be hung on said detachable accessory handling frame of said first accessory.

22. System according to claim 11, wherein said pipelaying system is adapted for reel laying, and wherein said system includes a storage reel for pipeline.

23. System according to claim 22, wherein the launch structure includes at least one pipeline tensioner arranged above the pipeline connection position.

24. System according to claim 11, wherein said launch device includes a launch structure having variable inclination.

25. System according to claim 24, wherein one or more support struts, are associated with said launch structure to maintain its desired inclination.

26. System according to claim 24, wherein said launch structure is slideable over a support rail, which support the lower end of said launch structure.

27. System according to claim 11, wherein the launch device includes a displaceable workstation, at least providing a shielded working area at said pipeline connecting position when said workstation is in an operating position thereof, which workstation is displaceable to a remote position to allow for the placement of an accessory at said pipeline connecting position.

28. System according to claim 27, wherein said workstation is adapted for horizontal translation.

29. System according to claim 28, in which the workstation and the accessory handling device are mounted on a frame, which frame with the workstation and the accessory handling device is moveable with respect to the pipeline launch device.

30. System according to claim 11, wherein the clamp is arranged movable, so as to allow for the passage of the accessory integrated into the pipeline.

31. System according to claim 30, wherein the clamping device is mounted for translation in horizontal direction between an active position near the firing line of the pipeline and a remote position.

32. System according to claim 30, wherein the clamping device is supported by a parallelogram structure, so as to be mobile essentially parallel to the firing line.

33. Marine pipelaying system according to claim 11, the system further comprising:
 a pipeline launch device for launching the pipeline from the vessel in the direction of the seabed in a pipeline launch trajectory;
 a storage reel for pipeline to be laid;
 a pipeline guide, arranged at an elevated position in said pipeline launch device; and one or more tensioners arranged on said pipeline launch device below said pipeline guide for supporting the weight of the launched pipeline, wherein said pipeline launch device is provided with withdrawal means for withdrawing a section of the pipeline upwards out of the pipeline launch trajectory.

34. A marine pipelaying system to be mounted on a vessel for installing an offshore pipeline that includes one or more accessories, the system comprising:

a pipeline launch device for launching the pipeline from the vessel in the direction of the seabed;

a pipeline clamping device adapted to clamp and support the weight of the previously launched pipeline; and an accessory handling device, which is adapted to receive and support an accessory and allow displacement thereof between an receiving position, wherein the accessory is received by the handling device and a pipeline connecting position, wherein the accessory can be connected to the pipeline, wherein said accessory handling device has a rail structure, said rail structure being mounted on said pipe launch device, and wherein said accessory handling device includes a first subframe, which is mounted on said rails structure and is slideable along said rail structure, and a second subframe, which is supported by said first subframe so as to be orientable in one or more degrees of freedom with respect to said first subframe, and wherein one or more actuators are provided between said first and said second subframe to allow accurate orientation of said second subframe.

35. System according to claim 34, where said second subframe is movable parallel to the first subframe, and wherein at least one actuator is provided for parallel motion, of the second frame.

36. System according to claim 34, wherein said second subframe is orientatable so as to include an angle with the first subframe.

37. System according to claim 36, wherein between the first and second subframes at least three actuators are provided in a spatial arrangement, allowing orientation of the second subframe with respect to the first subframe.

38. System according to claim 36, wherein between the first and second subframes a first set of positioning actuators and a second set of positioning actuators are provided, said first and second set being spaced apart from one another and each including at least two spaced apart actuators, so as to allow orientation of the second subframe with respect to the first subframe.

39. System according to claim 34, wherein the second subframe has one or more hook members adapted to hang the accessory thereon.

40. System according to claim 34, wherein said pipeline connecting position is above the clamping device.

41. Method for installing an offshore pipeline that includes one or more accessories, wherein use is made of a system according to claim 34.

42. Marine pipelaying system according to claim 34, the system further comprising:

a pipeline launch device for launching the pipeline from the vessel in the direction of the seabed in a pipeline launch trajectory;

a storage reel for pipeline to be laid;

a pipeline guide, arranged at an elevated position in said pipeline launch device; and one or more tensioners arranged on said pipeline launch device below said pipeline guide for supporting the weight of the launched pipeline, wherein said pipeline launch device is provided with withdrawal means for withdrawing a section of the pipeline upwards out of the pipeline launch trajectory.

43. Method for installing an offshore pipeline that includes one or more accessories, wherein use is made of a system according to claim 11.

* * * * *